United States Patent [19]
Kirschey

[11] Patent Number: 4,664,642
[45] Date of Patent: May 12, 1987

[54] HIGH ELASTICITY FLEXIBLE SHAFT COUPLING

[75] Inventor: Gerhard Kirschey, Wuppertal, Fed. Rep. of Germany

[73] Assignee: Centa Antriebe Dipl. Ing. G. Kirschey GmbH & Co. KG, Haan, Fed. Rep. of Germany

[21] Appl. No.: 792,762

[22] Filed: Oct. 30, 1985

[30] Foreign Application Priority Data

Nov. 9, 1984 [DE] Fed. Rep. of Germany ....... 3441008

[51] Int. Cl.$^4$ ............................................. F16D 3/58
[52] U.S. Cl. ........................................ 464/96; 464/85
[58] Field of Search ...................... 464/83, 85, 87, 89, 464/90, 91, 92, 96, 94, 95

[56] References Cited

U.S. PATENT DOCUMENTS

| | | | |
|---|---|---|---|
| 2,406,875 | 9/1946 | Wallerstein, Jr. | 464/83 |
| 2,453,012 | 11/1948 | Hickman | 464/87 |
| 2,556,624 | 6/1951 | Macbeth et al. | 464/92 |
| 2,672,907 | 3/1954 | MacLean | 464/85 X |
| 3,023,593 | 3/1962 | Nallinger | 464/96 X |
| 4,563,166 | 1/1986 | Walter et al. | 464/92 X |

FOREIGN PATENT DOCUMENTS

| | | | |
|---|---|---|---|
| 101438 | 5/1962 | Netherlands | 464/85 |
| 129620 | 10/1950 | Sweden | 464/91 |
| 2094936A | 9/1982 | United Kingdom | 464/96 |

OTHER PUBLICATIONS

Kupplungs-Atlas, August Schalitz, A.G.T. Verlag Georg Thum, Germany, p. 51 (1969).

Primary Examiner—Daniel P. Stodola
Attorney, Agent, or Firm—Karl F. Ross; Herbert Dubno

[57] ABSTRACT

The resilient shaft coupling for connection of two coupling parts comprises at least two coupling members resilient under application of an applied torque, of which at least one is mountable on a first coupling part and at least one of the other coupling members is mountable on another one of the coupling parts, wherein the coupling members are mounted on a common connecting piece freely movable relative to the coupling parts. To provide a coupling in which the coupling parts are free from axial force loads, the outer surfaces of the coupling members facing in the same axial direction are connected to the coupling parts. Each of these outer surfaces lie substantially in a radial plane of the axle coupling, while the sides of the coupling members facing in the opposite axial direction from the outer surfaces of the coupling members connected to the coupling parts are coupled to the connecting piece.

8 Claims, 7 Drawing Figures

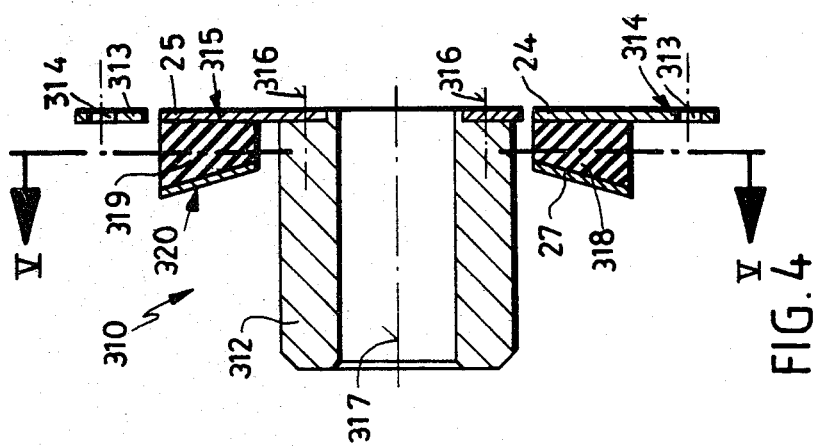
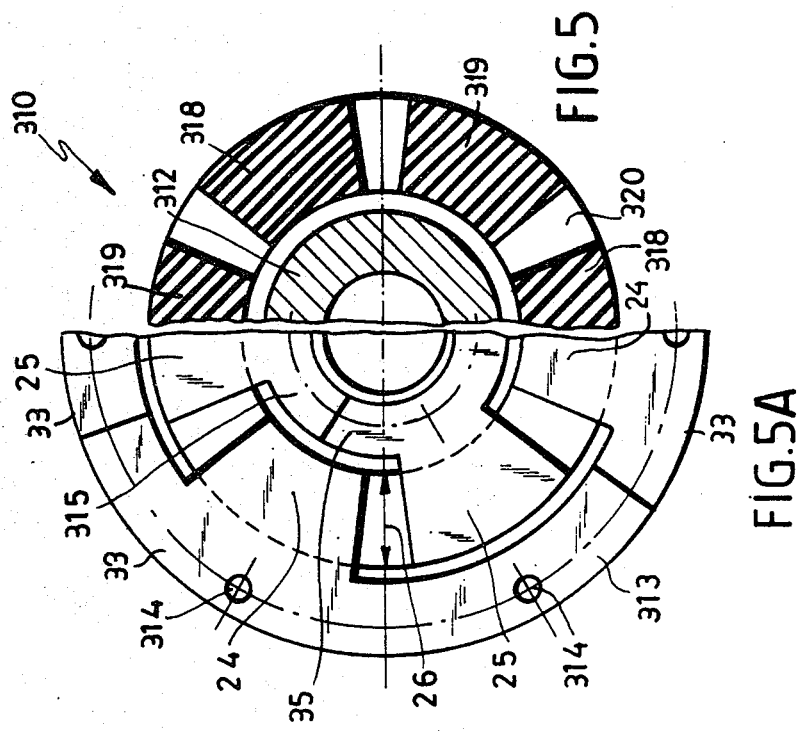

HIGH ELASTICITY FLEXIBLE SHAFT COUPLING

FIELD OF THE INVENTION

My present invention relates to a flexible or resilient coupling for connecting two coupling parts and, more particularly, to a highly elastic flexible shaft coupling for connecting two coupling parts affording transmission of torque between two rotatable members of a device, such as a shaft and a driving or driven member.

BACKGROUND OF THE INVENTION

Known resilient flexible shaft couplings for connection of two coupling parts can comprise at least two, preferably rubber, coupling members or bodies resilient to applied torques, of which at least one is mountable to or is mountable on a first coupling part and at least one other is mountable on or mounted to a second coupling part, and wherein the coupling members are mounted on a common connecting piece positioned so as to be freely movable relative to the coupling parts.

A coupling of this type is described in German Patent DE-PS No. 725 651. The individual resilient, rubber coupling members are vulcanized on the one hand to the driven and on the other hand to the driving half of the coupling, and with the aid of a connecting piece, again vulcanized to them, are coupled with each other.

Couplings of this type, in which the resilient rubber elements transmit forces produced by an applied torque, on account of their elastic flexibility, are very advantageous. However, centrifugal and circumferential forces occuring during operation cause the resilient rubber coupling members to be drawn together in the axial direction. Tractive forces are thus applied to both coupling parts, which can not generally follow them, to stress the resilient rubber coupling members axially in a disadvantageous way.

It is of course technically possible to construct such couplings free from axial force loads; however the structures for correct couplings of this nature are necessarily expensive. One kind of coupling, which avoids the above described difficulty, is shown in illustration 3.2.5-21 in "Coupling Atlas", A.G.T. George Thrum, publisher, 7140 Ludwigsburg, Germany 1969. This coupling comprises a pair of resilient rings, which are clamped together opposite each other. Each ring comprises an inner ring member and an outer ring member with a substantially resilient rubber circular or ring shaped coupling member positioned therebetween, wherein each ring is mounted over two concentric coupling member annular elements, which are vulcanized coaxially to a metal ring.

Even if the comparatively large expense of this coupling, particularly in the parallel twin configuration, can be justified, there remains the disadvantage that the coupling is comparatively stiff under an applied torque.

OBJECTS OF THE INVENTION

It is an object of my invention to provide a comparatively simple highly elastic flexible shaft coupling which operates free from axial force loads on the coupling parts, but is comparatively inexpensive and yet is not stiff under an applied torque.

It is a more general object of my invention to provide an improved resilient shaft coupling.

It is also an object of this invention to provide an improved resilient shaft coupling which is free from an axial force load, but is comparatively inexpensive.

It is a further object of my invention to provide an improved resilient shaft coupling, which is free from axial force loads, but is not stiff under an applied torque, and which avoids drawbacks of prior art constructions.

SUMMARY OF THE INVENTION

These objects and others which will become more apparent hereinafter are attained in accordance with my invention in a coupling for connection of two coupling parts in a shaft coupling comprising at least two, preferably rubber, coupling members resilient under applied torques, of which at least one is mountable on a first coupling part and at least one other is mountable on a second coupling part, wherein the coupling members are mounted on a common connecting piece freely movable in relation to the coupling parts.

According to my invention the outer surfaces of the coupling members facing in the same axial direction are connected to the coupling parts. Each of these outer surfaces can lie substantially in a radial plane of the resilient shaft coupling.

The sides of the coupling members facing in the opposite axial direction from the outer surfaces of the coupling members connected to the coupling parts are coupled to a connecting piece, although the connecting piece does not directly contact the coupling parts itself.

Thus the coupling of my invention operates without communicating an axial force load or stress to the coupling parts, but is comparatively inexpensive and is not disadvantageously stiff under an applied torque.

With my invention the following is therefore achieved: in both coupling members or in both positions for a coupling member, of which one is associated with one coupling part and the other with the other coupling part, equal or equally aligned axial forces occur, which are neutralized in the free "floating" common connecting piece of the coupling members. Every axial displacement occuring by the centrifugal and circumferential forces is not communicated to the coupling parts, but results only in a well-defined displacement of the "floating" connecting piece.

According to one preferred embodiment of my invention the coupling members are disposed or positioned radially in tandem, while in other preferred embodiments of my invention, the coupling members are disposed or positioned axially in tandem. Also the coupling members may be distributed around the circumference of the resilient axle coupling.

In each case it is essential that the coupling member connected rigidly with the first coupling part have the same elastic properties as the coupling member connected rigidly to the second coupling part.

Both coupling members should according to my invention experience a qualitatively and quantitatively equal displacement in the axial direction, which only follows the connecting piece coupled to them, but does not try to follow the coupling parts.

In this way it is guaranteed that the coupling is kept free from axial force loading in a simple structural form, whereby each of the resilient coupling members, however, also the coupling as a whole—without being too stiff under an applied torque—is exposed to substantially reduced loads. This coupling is not broken by the compensatory adjustments experienced during operation.

According to a preferred embodiment of my invention for connection of the coupling members to the coupling parts and for connection of the coupling members with each other metal disks are provided to which the coupling members are vulcanized. Metal rings may also be used instead of metal disks.

In another preferred embodiment of my invention only two coupling members are employed and those coupling members are ring shaped.

Furthermore advantageously in a further embodiment the coupling members are divided into a plurality of coupling member segments which are positioned circumferentially about the resilient shaft coupling. Furthermore correspondingly the metal disks used to atttach them to the coupling parts can be divided into a plurality of disk segments distributed substantially circumferentially about the resilient shaft coupling and positioned to correspond to the coupling member segments.

According to yet another preferred embodiment of my coupler, in which metal disks are used for connections and the coupling members are divided into a plurality of circumferential coupling member segments, the metal disks are provided with radially directed segmentlike projections overlapping radially without contact in the circumferential direction, so as to provide contacting surfaces for the coupling members.

Also advantageously in further preferred embodiments the connecting piece has a substantially U-shaped cross section. Further the connecting piece may be supported by means of a radial ball bearing on one of the coupling parts to avoid unwanted radial excursions.

BRIEF DESCRIPTION OF THE DRAWING

The above and other objects, features, and advantages of my invention will become more readily apparent from the following description, reference being made to the accompanying highly diagrammatic drawing in which:

FIG. 4 is an axial cross section view through a fourth preferred embodiment of a shaft coupling according to my invention with the coupling member segments distributed in tandem about the circumference of the coupling;

FIG. 5 is a partial cross section view of the coupler according to FIG. 4 taken along the section lines V—V of FIG. 4;

FIG. 5A is a partial front plan view of the coupler according to FIG. 4; and

SPECIFIC DESCRIPTION

Figure 1:
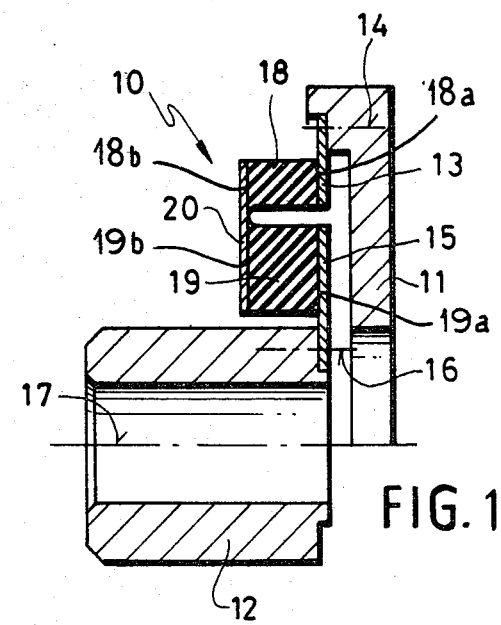
FIG. 1 is a longitudinal cross sectional view of a shaft coupling according to my invention, whose resilient coupling members are connected in tandem radially.

In the drawing corresponding parts in the several embodiments are identified with similar numerals differing in the hundreds place for the respective embodiments.

The resilient coupling 10 according to the embodiment of FIG. 1 connects a first coupling part or member 11 with a second coupling part or member 12, wherein in the drawing the first coupling part 11 is formed as a flange and the second coupling part 12 is formed as a hub.

The coupling 10 comprises a first ring 13, which is connected to the first coupling part 11, for example by screws represented by the screw axes 14.

A second ring 15 is positioned in the same plane as the first ring 13 concentrically within the first ring 13. The second ring 15 serves to facilitate connection of first ring 13 and second coupling part 12, by for example screws along screw axes 16.

On planar surfaces of ring 13 facing left in FIG. 1 a first annular resilient coupling member or body 18 at its second face 18a is vulcanized thereon. Similarly a second annular resilient coupling member or body 19 is vulcanized on the planar surfaces of ring 15 also facing left in FIG. 1 at its second surface 19a.

The first surfaces 18b, 19b of both first and second coupling members 18 and 19 facing left along the coupling axes 17 are connected to each other by connecting piece or element 20, which is vulcanized to the outside surfaces on each coupling member 18 and 19. The connecting piece 20 is shaped like a flat ring, washer, or disk with a central hole therein and exclusively contacts the first and second coupling members 18 and 19, and not the coupling parts 11 and 12 so that it is free to move relative to both.

The coupling members 18 and 19 are of equal thickness in the axial direction. In the embodiment of FIG. 1, however, the radial width of the exterior of first coupling member 18 is smaller than that of the second coupling member 19. The difference of these dimensions is such that under the influence of centrifugal and circumferential forces the reduction of the axial cross sectional width of both first and second coupling members is equal. The connecting piece 20 can follow unimpeded the equal pulling forces in the axial direction; the effects of these forces are thus completely neutralized and are not transferred to the coupling parts 11 and 12.

Figure 2:
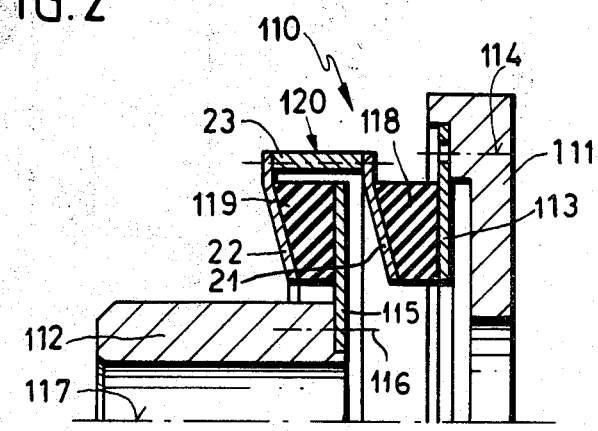
FIG. 2 is a longitudinal cross section view of a shaft coupling according to my invention, whose resilient coupling members are connected in tandem axially.
Figure 3:
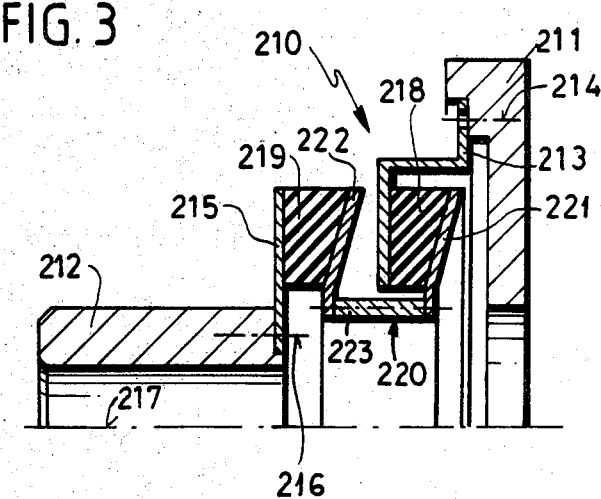
FIG. 3 is a longitudinal cross section view of another shaft coupling according to my invention, whose resilient coupling members are connected in tandem axially.

The embodiments of FIGS. 2 and 3 differ from that of FIG. 1 by the axially tandem arrangement of the first and second coupling members 118 and 119 or 218, 219.

While the first and second coupling members 218 and 219 are axially spaced their inner and outer peripheries are radially coincidental their shapes are identical. On account of greater deformation experienced with increasing distance from the coupling axis 117 or 217, the axial cross sectional width of these coupling members 118 and 199 or 218,219 is increased radially. The connecting piece 120 or 220, since it must be attached to the outer surfaces of both coupling members 118 and 119 or 218 and 219 facing in the same direction, must not be disk or ring shaped, but instead has a U-shaped cross section.

In the embodiment of FIG. 2 the rings 113 and 115 of the coupling parts 111 and 112 are vulcanized to the outer surfaces of the coupling members 118 and 119 facing to the right, while both legs 21 and 22 of the connecting piece 120 are vulcanized on the outer surfaces of the coupling members 118 and 119 respectively facing to the left in the axial direction. The joint connecting bridge 23 is positioned on the outside of the coupling 110 in the circumferential direction.

In FIG. 3 the basic structural principles are the same, only here the rings 213 and 215 of the coupled parts 211 and 212 are vulcanized to the outer surfaces of the coupling members 218 and 219 facing to the left. Since in the embodiment shown the flange 211 does not overlap the coupling member 218, the connector 213 in this embodiment is bent at right angles into an approximately "Z" shape.

The connecting piece 220 engages correspondingly with each of its legs 221 and 222 on the outer surfaces of the coupling members 218 and 219 facing to the right. Also here it is apparent that the axial forces occuring in the coupling members 218 and 219, which are identical in direction and magnitude for both coupling members 218 and 219, will be absorbed in the connecting piece 220, which also can "float" unhindered in the axial direction. The bolts 114, 116 and 214,216 perform functions similar to those of screws 14,16 mentioned earlier.

Furthermore in the embodiments of FIGS. 1 to 3, both the coupling members 18, 19, 118, 119 and 218,219 and the metal disks connected to them should be formed substantially circular or ring shaped, so that these parts can be constructed also in segments which are distributed about the circumference of the coupling. This principle is essential: that the forces operating on the coupling parts 11, 111, 211 are transferred first by the rings 13, 113,213, then by the first resilient coupling members 18, 118, 218, and are then transmitted to the connecting pieces 20, 120, 220. From these parts these forces are distributed to the coupling members 19, 119, 219 and by the rings 15, 115, 215 connected to it to the second coupling parts 12, 112,212.

In FIGS. 4, 5 and 5A a ring 313 with screw holes 314 serves for connection to the first coupling member which has not been illustrated can be represented by the axes through these holes. The ring 313 has three projections 24 directed inwardly radially distributed over the circumference of the ring 313, which have mounting surfaces for the resilient coupling member segments 318.

A ring 315 is connected to the second coupling part 312 formed here as a hub again with screws. This ring 315 has three projections 325 directed radially to the exterior distributed around the circumference, to which also coupling member segments 319 are vulcanized. The radial projections of the two rings interdigitate.

As shown in FIGS. 5 and 5A each inwardly directed projection 24 of the ring 313 follows circumferentially an outwardly directed projection 25 of the ring 315, which does not contact it.

In the radial direction they overlap to the extent 26 as shown in FIG. 5A which is also equal to the width of the coupling member segments 318 and 319.

Both of the rings 313 and 315 lie in the same radial plane, and the resilient coupling member segments 318 and 319 belonging to them are again vulcanized to the circular surfaces shown facing the same axial direction. The connection of the coupling member segments 318 and 319 following each other alternatingly in the circumferential direction is made by a conical member 27 functioning as connecting member 320. It is not necessary that conical member 27 be closed in the circumferential direction, however it must connect at least each first coupling member segment 318 with each second coupling member segment 319. However also in this preferred embodiment the connecting members 320 can essentially "float" freely in the direction of the coupling axis 317, when the forces operating in the axial direction in the coupling members 318 and 319 occur. Also this coupling is free from axial force loads.

Figure 6:
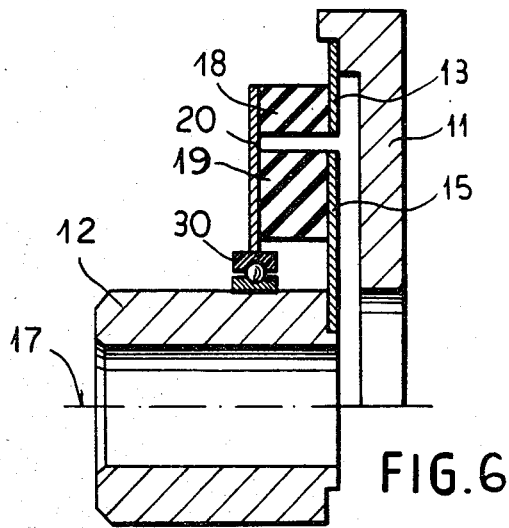
FIG. 6 is a longitudinal cross section view of an embodiment similar to that of FIG. 1, whose resilient coupling members are connected in tandem radially and which has an additional radial ball bearing to prevent unwanted radial excursions of the connecting piece.

In order to prevent an extreme excursion of the connecting member 20 radially, it is suitable and advantageous, to support or brace the connecting member 20 by means of an axially freely adjustable radial bearing 30, for example, on the hub 12, as shown in FIG. 6.

In the embodiment of FIGS. 4, 5 and 5A both rings 13 and 15 may be divided into disk segments 33 and 35 respectively as indicated in the drawing.

I claim:

1. A high-elasticity flexible shaft coupling for the connection of two coupling parts axially spaced along a common axis, comprising:

A first coupling member and a second coupling member resilient under applied torque spaced apart along said axis and disposed therearound, said coupling members having substantially the same axial cross sections and being correspondingly oriented with respect to said parts, said coupling members having just surfaces facing in a first axial direction and mutually parallel second surfaces facing in a second opposite axial direction;

a respective first connecting element bonded to each of said first surfaces for connecting said coupling members to a respective one of said parts;

a respective second connecting element bonded to each of said second surfaces; and means radially offset from peripheries of said coupling members for rigidly securing said second connecting elements together.

2. The high-elasticity flexible shaft coupling defined in claim 1 wherein said elements are vulcanized to the respective surfaces.

3. The high-elasticity flexible shaft coupling defined in claim 1 wherein said connecting elements are thin metal elements.

4. The high-elasticity flexible shaft coupling defined in claim 3 wherein said first surfaces lie in planes perpendicular to said axis and said second surfaces are frustoconical frustoconicla to said first element, said first elements being planar rings and said second elements having frustoconical configurations.

5. The high-elasticity flexible shaft coupling defined in claim 4 wherein said means radially offset from said peripheries of said coupling members is an axially extending ring lying inwardly of said coupling members.

6. The high-elasticity flexible shaft coupling defined in claim 4 wherein said means radially offset from peripheries of said coupling members includes an axially extending ring surrounding one of said coupling members.

7. The high-elasticity flexible shaft coupling defined in claim 4 wherein each of said coupling members is constituted by an array of elastic segments extending around a circle.

8. The high-elasticity flexible shaft coupling defined in claim 7 wherein said elements have segmental portions each bonded to one of said segments.

* * * * *